J. J. H. GRAMSER.
PROCESS FOR MARKING CHEESE.
APPLICATION FILED NOV. 7, 1912.
1,090,102.
Patented Mar. 10, 1914.
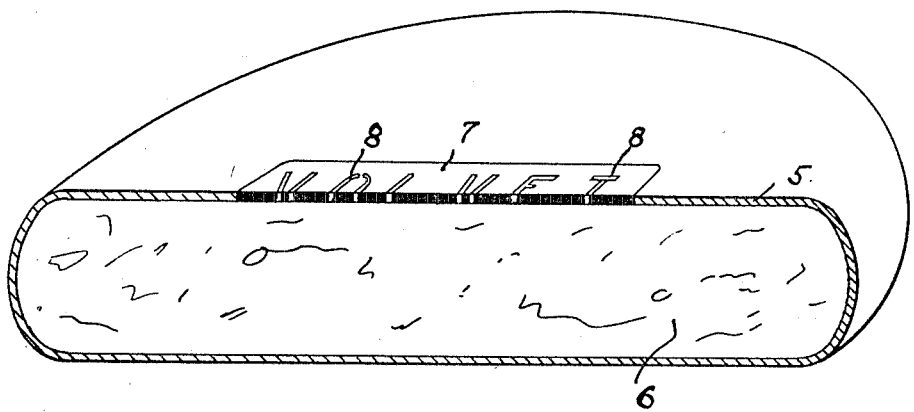
Witnesses:
L. H. Grote
A. E. Powell
Inventor
Jan Johan Hendrik Gramser
By his Attorneys

UNITED STATES PATENT OFFICE.

JAN JOHAN HENDRIK GRAMSER, OF SCHRANS, NEAR LEEUWARDEN, NETHERLANDS.

PROCESS FOR MARKING CHEESE.

1,090,102.  Specification of Letters Patent.  Patented Mar. 10, 1914.

Application filed November 7, 1912. Serial No. 730,084.

*To all whom it may concern:*

Be it known that I, JAN JOHAN HENDRIK GRAMSER, a citizen of the Kingdom of the Netherlands, residing at Schrans, near Leeuwarden, in the Province of Friesland, Netherlands, have invented certain new and useful Improvements in Processes for Marking Cheese, of which the following is a specification.

My invention relates to the marking of cheese and the particular object of my invention is to mark the cheese in such manner that the mark cannot get lost, cannot be applied after the cheese is finished, does not become obliterated on mechanical cleaning, viz., planing, of the cheese, does not injure the crust or corrupt or facilitate the corruption of the cheese, and finally cannot be used more than once.

It has heretofore been generally customary for the manufacturer to apply his trademark to cheese by painting or pasting the same thereon. In some cases the mark is impressed in the crust of the cheese and it has even been proposed to apply the mark by tattooing the same in the crust. These methods are deficient in one respect or another because they are either effaced during the mechanical planing of the cheese, or may be easily removed and fraudulently replaced by others, or else injure the cheese by exposing it to decay.

These deficiencies are remedied by the present invention, which consists in forming the mark in casein, preferably of distinguishing color, and embodying this in the crust of the cheese while the latter is still soft during the process of its manufacture, pressing the cheese with the mark thus embodied therein and then maturing the cheese. During the maturing of the cheese the mark becomes substantially integral with the cheese crust, an exchange of properties taking place which renders it impossible for the mark to be again used with like results in a second cheese. The mark is preferably stamped from the casein material in the form of a thin layer, which is placed in the press with the initially shaped cheese, and the press then put in operation to give the cheese its final shape. The mark is thus mechanically united with the body of the cheese and the action taking place during the ripening which follows, renders the parts substantially integral and homogeneous. The mark in fact becomes part of the crust, from which it can be removed only by cutting it out.

In the accompanying drawing a cheese is represented in sectional perspective, the section being taken through a mark embedded in the crust in accordance with my invention.

The thickness of the crust 5 of the cheese 6 has been exaggerated for the sake of clarity. The mark may be displayed in various ways. I have here represented it by way of example, merely as stenciling 8 in the casein strip 7. When the strip of stenciled casein is pressed with the cheese, the latter enters the stencil perforations and forms a mechanical joint therewith at once. During the subsequent ripening of the cheese the mark becomes so much a part of the cheese crust that their physical properties are practically indistinguishable.

A mark of this character cannot be used a second time, since it would not unite with the fresh cheese, but would fall out when the cheese has ripened. Similarly it is impossible to apply it to a finished and matured cheese because there is no chance in this case for the union to proceed which is essential to the incorporation of the mark in the crust.

It is to be borne in mind that the present mark is distinguishable from the rest of the cheese only by reason of its color. It is of course immaterial whether the casein which forms the mark be colored or the cheese proper be colored, so long as they are distinguished from one another.

It is to be noted that it is not necessary that the casein (preferably with its adjunct of innocuous coloring matter) be made up fresh for each batch of cheeses to be marked. It may be prepared in large quantity, dried and kept either shaped into the mark or rolled out into a thin layer, for subsequent use.

I claim as my invention:—

1. A method of marking cheese which consists in placing upon the surface of a preliminarily shaped cheese while the latter is still soft in the process of manufacture, a piece of distinguishingly colored casein adapted to unite with the cheese to form a substantially homogeneous portion of the cheese crust, subjecting the cheese to compression in a press whereby the casein is embedded in the surface of the cheese, and permitting the cheese to ripen, whereby said piece of casein becomes indistinguishable from the cheese crust save by color, substantially as described.

2. A cheese having as an integral portion of its crust a piece of casein substantially homogeneous therewith and distinguishable therefrom only in color, substantially as described.

In testimony whereof I affix my signature in presence of two witnesses.

JAN JOHAN HENDRIK GRAMSER.

Witnesses:
J. T. WANDERLEY,
P. T. RUIJI.